United States Patent Office 3,431,997
Patented Mar. 11, 1969

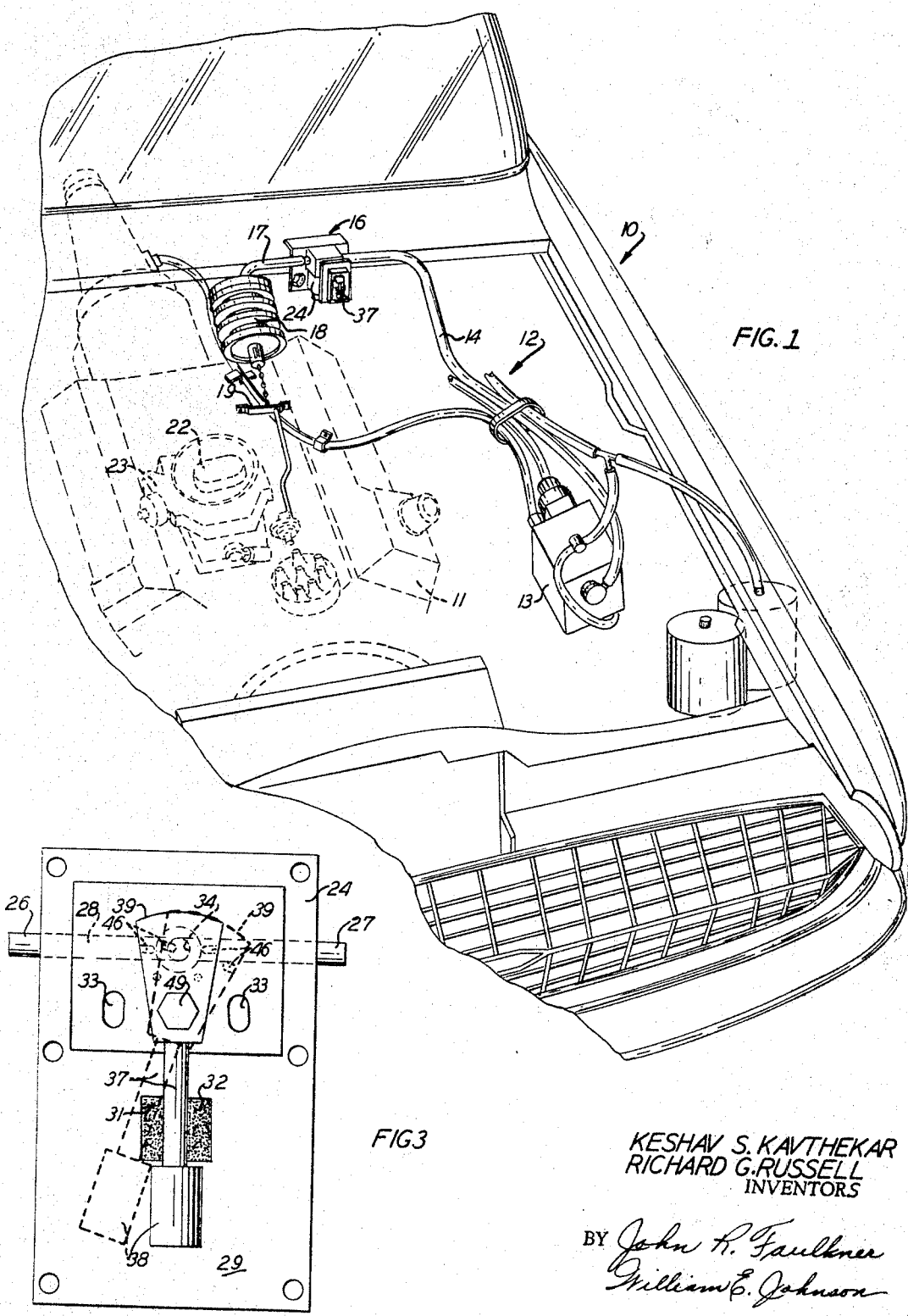

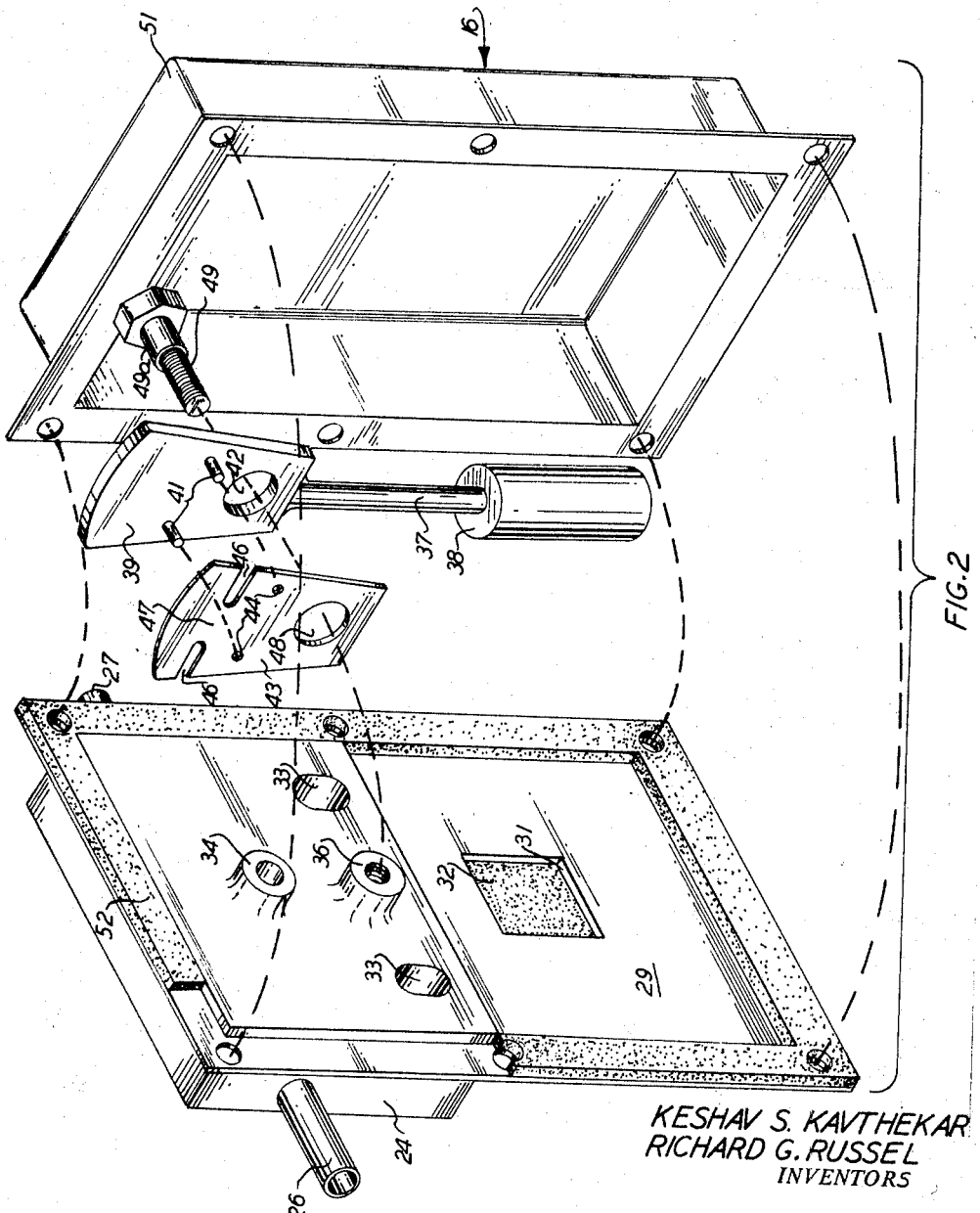

3,431,997
ATTITUDE COMPENSATOR DEVICE FOR A MOTOR VEHICLE SPEED CONTROL SYSTEM
Keshav S. Kavthekar, Detroit, and Richard G. Russell, Dearborn, Mich., assignors to Ford Motor Company, Dearborn, Mich., a corporation of Delaware
Filed May 23, 1967, Ser. No. 640,663
Int. Cl. B60k 31/00; F02d 11/08
U.S. Cl. 180—108                                     2 Claims

ABSTRACT OF THE DISCLOSURE

The vacuum line of a speed control system of a motor vehicle has a port therein. The port is sealed by a non-permeable member which is secured to a pivotally mounted pendulum. The pendulum, in response to the movement of the vehicle into a sharp curve, swings sufficiently with respect to the vehicle to align vacuum bleeding slots in the non-permeable member with the port of the speed control system. As the vacuum is reduced in the speed control system, the engine speed of the vehicle is also reduced sufficiently that the vehicle passes through the curve at a reduced speed.

Background of the invention

This invention relates to an attitude compensator device for a speed control system of a motor vehicle and, more particularly, to such a device wherein the vacuum within the speed control system is maintained at a constant level, associated with a preselected speed, until the device measures that the motor vehicle is in an undesired attitude with respect to the highway at which time the device allows the vacuum level of the speed control system to drop off whereby the speed of the vehicle is decreased.

In recent years, speed control systems have been developed which operate on the engine of a motor vehicle in such a manner that the driver of the motor vehicle may set the engine speed at a predetermined level and then remove his foot from the accelerator pedal. When the driver of a vehicle selects a speed and actuates the speed control system, the preselected speed setting is translated into a reference degree of vacuum in a bellows. The bellows, in turn, through linkages sets the throttle plate of the engine's carburetor to such a position that the engine will propel the vehicle at the desired speed. During operation of the vehicle, correlations are made in the speed control system between the speed desired and the actual speed of the vehicle. If the speeds do not correlate, the reference vacuum is adjusted in the bellows so that the desired vehicle speed is achieved.

When the driver of a motor vehicle presets the speed control system at a selected speed, the vehicle will travel at this speed even though it passes into a portion of the highway in which the vehicle should be operated at a speed below that selected. On today's more modern highways, the curves are generally graded in such a manner that the vehicle may traverse the curves at the same speed at which the vehicle may traverse the straight or level portions of the highway. However, a great portion of the highway curves are not designed to be traversed at the same speed at which straight or level portions of the highway may be traversed. In these cases, if the vehicle driver has preset the speed control to a desired speed for traveling over the normal portions of the highway, the driver finds that when a curve is encountered, the vehicle is generally traveling at a speed that is uncomfortable to the driver. It is, therefore, necessary for the driver to disengage the speed control system and to take command of the vehicle again while it is going through the curve. After completing the curve, the driver then resets the speed control system to the desired speed.

Summary of the invention

This invention is directed to an attitude compensator device for an automatic, vacuum operated speed control system for a motor vehicle. The attitude compensator is relatively inexpensive to build and is extremely efficient for decreasing the speed of the vehicle as it passes through curved portions of a highway.

The attitude compensator device of this invention has a deflectable member for measuring the attitude of the vehicle with respect to the highway. The deflectable member is in a normal position when the vehicle is in a normal attitude with respect to the highway and the member is displaced from the normal position when the vehicle is displaced from a normal attitude with respect to the highway. The displacement of the deflectable member is proportional to the displacement of the attitude of the vehicle with respect to a normal vehicle attitude. A vacuum reducing member is progressively actuated by increased displacement of the deflectable member from that member's normal position. Upon actuation, the vacuum reducing member decreases the vacuum level in the speed control system in proportion to the displacement of the attitude of the vehicle from a normal attitude. Such a reduction in vacuum within the speed control system causes a reduction in the speed of the engine and the vehicle to a degree sufficient to permit traversal of the highway by the vehicle at a speed lower than that set in the speed control system.

Brief description of the drawings

FIGURE 1 is a perspective view showing a speed control system and a preferred embodiment of the attitude compensator device of this invention as mounted in an automobile vehicle. FIGURE 2 is an isometric view showing, in detail, the preferred attitude compensator device. FIGURE 3 is a view showing the non-actuated, port closing position (solid lines) and the actuated, port opening position (dotted lines) of the attitude compensator device.

Description of the preferred embodiment

In FIGURE 1 there is shown a motor vehicle, generally identified by the numeral 10. The vehicle has an engine 11, the operation of which may be controlled by a speed control system, generally identified by the numeral 12. The speed control system 12, as typified by the system shown in U.S. Patent 2,990,825, takes vacuum from the manifold of the engine 11 into a regulator assembly 13. In response to the setting of the speed control by the vehicle driver, a metered amount of vacuum is drawn on a vacuum line 14 by the regulator assembly 13. The metered amount of vacuum passes through passageways in the attitude compensator device of this invention, generally identified by the numeral 16, to a second vacuum line 17. The second vacuum line is connected to a bellows 18. As the vacuum applied by the regulator assembly 13 on the lines 14 and 17 is increased, the vacuum applied to the bellows 18 brings about a controlled collapse thereof. As it collapses, the bellows operates a mechanical linkage 19 so as to set a throttle plate 22 of a carburetor 23 in such a relative position that the engine 11 maintains a set speed. Thus, the motor vehicle 10 traverses the highway at the speed at which the speed control system has been set by the motor vehicle driver.

In prior speed control systems, an attitude compensator device has not been utilized therewith. Without such a compensator, when the speed control system had been preset for a certain speed, the vehicle would proceed from a relatively straight or level portion of a highway into a curved or turning portion at the preset speed. In many instances, the speed at which the vehicle was traversing the straight or level highway was far above the speed which would be considered proper for traversing the curved or turning highway into which the vehicle had now proceeded. Thus, it was necessary for the operator to disengage the speed control system, generally by touching the brake pedal, and again take over operation of the vehicle by regulating the speed through selective utilization of the brake and accelerator pedal.

The attitude compensator device 16 of this invention, which is best shown in FIGURE 2, has been designed to decrease the engine speed of a motor vehicle operating under a speed control system when the vehicle moves from a straight or level portion of a highway into a curved or turning portion of the highway. The attitude compensator device 16 operates to decrease the engine speed and thus the motor vehicle speed in proportion to the degree to which the attitude of the motor vehicle exceeds motor vehicle attitudes which are within prescribed limits. The decrease in both engine and vehicle speed is automatic and is not necessary for the motor vehicle driver either to disengage the speed control system or to take control of the vehicle. When the vehicle has traversed the curved or turning portion of the highway, the engine speed and thus the vehicle speed is once again brought back to the preset level. If in traversing the curved or turning portion of the highway the attitude of the vehicle has not exceeded the prescribed limits, the attitude compensating device will not reduce the engine and vehicle speeds.

Now with reference to FIGURES 2 and 3, a detailed explanation of the attitude compensator device 16 of this invention will be made. The attitude compensator device 16, in its preferred embodiment, has a main support member or housing 24, the support housing having at the two side edges thereof tubes 26 and 27 extending therefrom. As best seen in FIGURE 3, tubes 26 and 27 define a passageway or vacuum line system 28 which extends through the support housing 24. A lower portion 29 of the support housing 24 is constructed of a thinner material than the housing and this lower portion has an opening 31 therethrough. An air filter media 32 is suitably secured to the lower portion 29 of a housing 24 so as to cover the entire opening 31. The support member 24 also has a pair of elongated openings 33 through which bolts may be driven in order to secure the housing to a supporting structure of the motor vehicle as depicted in FIGURE 1. The openings 33 are elongated so that the housing may be adjusted with respect to the vehicle when mounted such that the proper operating position of the elements of the device may be obtained when the vehicle is in normal attitude with respect to the highway. A port 34 is connected to the passageway or vacuum line system 28 defined in the support housing 24. Below the port 34 is a bolt mounting aperture 36.

As viewed in FIGURE 3, a pendulum 37 has a weighted end 38 and an upper portion 39 thereof. The upper portion 39 of the pendulum 37 is flat and has a pair of projecting pins 41 extending outwardly from one surface thereof. The upper portion 39 also has an opening 42 therethrough.

A non-permeable, flexible port closing member 43 has a pair of openings 44 therein. The flexible member 43 also has a pair of slots 46 therein each extending inwardly from an edge of the member toward the center thereof. The space 47 between two slots 46 is slightly larger in width than the diameter of the port 34 in the support member 24. The non-permeable member 43 also has an opening 48 therein and the slots 46 are located a distance above the center line of the opening 48 equal to the distance between the center line of the bolt mounting aperture 36 and the port 34.

*Assembly*

The attitude compensator device 16 of this invention is assembled by initially placing the non-permeable member 43 over the upper portion 39 of the pendulum 37 in such a manner that the openings 44 of the member 43 are aligned with and received on the pins 41 of the pendulum. The non-permeable member 43 is pushed downwardly so that the openings 44 thereof are received on the pins 41 whereby the member 43 is secured to the pendulum.

The opening 42 in the pendulum 37 and the opening 48 in the non-permeable member 43 are aligned by the initial assembly and a bolt 49 is inserted therethrough and threadingly engaged into the bolt mounting aperture 36 of the support housing 24. The bolt 49 has a smooth portion 49a on which the pendulum pivots. When so assembled, the pendulum 37 and the non-permeable member 43 forms a closure element for the port 34 when a vacuum is drawn on the passageway or vacuum line system 28. More particularly, the non-permeable member 43 is flexible such that when a vacuum is drawn on the vacuum line system 28 and thus the port 34, the flexible, non-permeable member 43 is drawn into engagement with the port 34 to seal the same thereby to maintain the level of the vacuum in the vacuum line system 28.

In order to increase the useful life of the attitude compensator device 16, the entire pendulum structure is preferably enclosed and air is allowed to enter the device only through the air filter media 32. Sealing of the device is accomplished by means of a gasket 52 placed around the outer periphery of the support housing 24. A top cover plate 51 is then attached to the support housing to close the device to entry of air thereinto other than through the air filter media 32.

*Operation*

As is best seen in FIGURE 1, the attitude compensator device 16 of this invention is mounted in the motor vehicle 10 in such a manner that the pendulum 37 is pivotable from side to side of the vehicle. Mounted in such a position, as the motor vehicle traverses a curved or turning highway, the forces acting on the pendulum 37 will cause the pendulum to rotate freely about the bolt 49 securing the same to the housing 24 in such a manner that the pendulum is deflected in a direction opposite the curve or turn. If the motor vehicle 10 is traversing a highway portion that has a curve to the left, as viewed from the driver's seat of the vehicle in FIGURE 1, the pendulum 37 will pivot counter-clockwise and the housing 24 will pivot clockwise. The housing 24 will pivot clockwise because the motor vehicle's attitude with respect to the highway will be tipped or canted to the right in a left curve. The pendulum will pivot to the right in the counter-clockwise direction because of the location of its pivot point and the forces acting thereupon.

When the pendulum 37 swings clockwise, as indicated in dotted lines in FIGURE 3, the flexible member 43 slides over the port 34 until the space or "dead band" area 47 is used up and a selected one of the slots 46 of the member 43 comes into alignment with and overlies the port 34. The "dead band" area 47 is not used up until the attitude of the motor vehicle with respect to the highway exceeds a prescribed attitude which prescribed attitude does not apply unwanted forces on the passengers of the vehicle or affect safe operation of the vehicle.

When the prescribed attitude is exceeded then an air passage is formed from the atmosphere through the selected slot 46, the port 34 and the vacuum line system 28. When positive pressure is allowed to seep into the vacuum line system 28, the bellows 18 is expanded. This expansion causes the mechanical linkage 19 to act upon the throttle plate 22 of the carburetor 23 to move the same toward a closed position in accordance with the amount of vacuum withdrawn from the system. In such a manner, the engine 1 of the motor vehicle 10 slows down and thus reduces the speed of the vehicle as it traverses the left curved portion of the highway.

The member 43 is slotted on both sides thereof, and the pendulum 37 is mounted for pivotable movement in either right or left directions. Thus, the attitude compensator device 16 is effective to operate to reduce the rate of speed of the vehicle whether the vehicle is traversing a curved or turning portion of a highway either to the right or to the left.

Also, once the vehicle 10 exceeds the prescribed attitude with respect to the highway the selected slot 46 is moved progressively across the port 34 by deflection of the pendulum 37 in accordance with the degree to which the attitude of the vehicle exceeds the prescribed attitude. It is apparent that the greater the displacement of the pendulum 37, the greater the amount of area of the port 34 which is overlaid by the selected slot 46. Thus, as a more drastically curved or turning portion of the highway is encountered, a greater amount of the vacuum will be withdrawn from the speed control system and thus, the speed of the vehicle will be decreased in proportion to and in accordance with the severity of the curved or turning portion of the highway into which the vehicle has moved.

A main feature of this invention is found in the fact that the port 34 need be the only fully machined surface of the attitude compensator device of this invention. More particularly, the use of a flexible, non-permeable member 43 to form an air tight seal between the member 43 and the port 34 eliminates the need of machining any part of the pendulum 37 to a high finish requirement. Since the member 43 is relatively thin and flexible, the vacuum in the vacuum line system 28 will act thereupon so as to draw the same into sealing relationship with the port 34 whereby the level of the vacuum in the vacuum lines 14 and 17 is maintained at a desired level until such time as the motor vehicle is driven into a curved or turning portion of a highway wherein the attitude of the vehicle exceeds the prescribed attitude. Thus, the attitude compensator device, as a whole, is relatively inexpensive to manufacture but yet is extremely beneficial as it is capable of compensating for various portions of the highway over which the vehicle is driven.

The attitude compensator device also allows the vehicle driver to maintain the speed control system in an operative condition since, as soon as the attitude of the vehicle is within the prescribed limit, the vehicle will again resume its speed so as to once again traverse the normal or level highway at the speed selected by the vehicle driver.

When the vehicle 10 is driven into a properly banked turn at a proper rate of speed the whole automobile is repositioned. Thus, even though the pendulum 37 swings in the direction opposite the curve, the support housing 24 is also pivoted in that direction by the change of attitude of the vehicle in the graded curve. Thus, the relative positions of the port 34 and the non-permeable material in the "dead band" area 47 of the member 43 stay in an abutting relationship to maintain the vacuum level in the speed control system.

There has been disclosed herein an attitude compensator device for utilization with a speed control system of a motor vehicle. The attitude compensator device of this invention is inexpensive to manufacture, reliable in operation and extremely well suited for use in conjunction with a vacuum operated speed control system of all types and designs.

We claim:

1. An attitude compensator device for a vacuum operated speed control system utilized to control the speed of the engine of a motor vehicle which comprises: a support housing; a vacuum line system in said support housing, said vacuum line system being connectable to the vacuum line of the speed control system; an opening in said vacuum line system defining a port; a pendulum pivotably mounted on said support housing at a point spaced from said port, said pendulum having a portion thereof which overlies said port; a flexible, non-permeable member attached to said overlying portion of said pendulum, said member being sufficiently flexible that when a vacuum is applied to said vacuum line system by the vacuum line of the speed control system said flexible member is drawn into engagement with said port to close said port; and means for mounting said support housing in the motor vehicle such that in response to movement of the vehicle into a curved or turning portion of a highway said pendulum will pivot sufficiently with respect to said support housing such that at least a portion of said non-permeable member is rotated out of engagement with said port whereby the vacuum in said vacuum line system is decreased and the engine speed is decreased thereby to reduce the speed of the vehicle so that the vehicle traverses the curved or turning portion of the highway at a safe and proper speed.

2. An attitude compensator device for a vacuum operated speed control system utilized to control the speed of the engine of a motor vehicle which comprises: a support housing; a vacuum line system in said support housing, said vacuum line system being connectable to a vacuum line of the speed control system; an opening in said vacuum line system defining a port; a pendulum pivotably mounted on said support housing at a point spaced from said port, said pendulum having a portion thereof which overlies said port; a flexible, non-permeable member attached to said overlying portion of said pendulum and interposed between said portion of said pendulum and said port, said member having opposed, notched-out portions alignable with said port when said pendulum is moved to a deflected position; and means for mounting said support housing in the motor vehicle such that when the motor vehicle is traversing a highway at a proper speed said pendulum is in a vertically aligned position with respect to said support housing and said non-permeable member is drawn against said port to seal the same because of the vacuum in the vacuum line of the speed control system and whereby as the motor vehicle traverses a curved or turning portion of the highway at an excessive speed for the portion of the highway, said pendulum is pivoted to a deflected position and a selected one of said notched-out portions of said non-permeable member become aligned with said port thereby to allow vacuum to be bled from said vacuum line system whereby the speed control system has a reduced degree of vacuum therein and the engine speed of the vehicle drops off so that the curved or turning portion of the highway is traversed at a speed below the speed at which the speed control system is set, the amount of said port exposed by said selected notched-out portion of said member being varied in accordance with the deflected position to which said pendulum is moved so that the reduction of speed of the vehicle is proportional to the severity of the curved or turning portion of the highway.

References Cited

UNITED STATES PATENTS

| 2,016,864 | 10/1935 | Lange. | |
| 2,432,166 | 12/1947 | Mallory. | |
| 3,305,042 | 2/1967 | Thorner | 123—103 X |
| 3,343,423 | 9/1967 | Thorner | 180—108 X |

KENNETH H. BETTS, *Primary Examiner.*

U.S. Cl. X.R.

123—103; 137—45